United States Patent [19]

Giraud et al.

[11] 4,367,402

[45] Jan. 4, 1983

[54] SYSTEM FOR KEEPING ACCOUNT OF PREDETERMINED HOMOGENEOUS UNITS

[75] Inventors: Georges Giraud, Le Vesinet; Jean Mollier, Bougival, both of France

[73] Assignee: Compagnie Internationale pour l'Informatique CII-Honeywell Bull, France

[21] Appl. No.: 143,863

[22] Filed: Apr. 25, 1980

Related U.S. Application Data

[63] Continuation of Ser. No. 889,517, Mar. 23, 1978, Pat. No. 4,256,955.

[30] Foreign Application Priority Data

Mar. 31, 1977 [FR] France .................. 77 09822

[51] Int. Cl.³ .................................................. G06F 7/02
[52] U.S. Cl. ......................................... 235/385; 235/488; 235/492
[58] Field of Search ............... 235/380, 487, 488, 492

[56] References Cited

U.S. PATENT DOCUMENTS

| | | | |
|---|---|---|---|
| 2,557,022 | 10/1949 | Wolowitz | 235/487 |
| 2,634,911 | 6/1951 | Wolowitz | 235/487 |
| 2,734,954 | 9/1956 | Kidd | 235/487 |
| 2,792,148 | 2/1956 | Goldenberg | 235/381 |
| 2,817,824 | 11/1958 | Albright | 235/487 |
| 2,914,746 | 11/1959 | James | 340/825.33 |
| 3,022,381 | 2/1962 | Pferd | 235/381 |
| 3,431,406 | 3/1969 | Anderson et al. | 235/153 |
| 3,504,343 | 3/1977 | Pitlow | 235/441 |
| 3,559,175 | 10/1967 | Pomeroy | 346/825.33 |
| 3,609,300 | 9/1971 | Halpern | 235/381 |
| 3,617,706 | 11/1971 | Oberhart | 235/487 |
| 3,641,499 | 2/1972 | Housman | 346/825.33 |
| 3,702,464 | 11/1972 | Castrucci | 340/173 SP |
| 3,748,441 | 7/1973 | Halpern | 235/381 |
| 3,816,711 | 6/1974 | Bliss | 235/488 |
| 3,845,277 | 10/1974 | Voss et al. | 235/379 |
| 3,868,057 | 2/1975 | Chavez | 235/488 |
| 3,870,866 | 3/1975 | Halpern | 235/419 |
| 3,906,460 | 9/1975 | Halpern | 340/825.33 |
| 3,908,894 | 9/1975 | Hatanaka et al. | 235/379 |
| 3,919,528 | 11/1975 | Cooper et al. | 235/379 |
| 3,934,122 | 1/1976 | Riccitelli | 340/825.33 |
| 3,935,933 | 2/1976 | Tanaka et al. | 194/4 R |
| 3,941,977 | 3/1976 | Voss et al. | 235/379 |
| 3,971,916 | 7/1976 | Moreno | 235/385 X |
| 4,001,550 | 1/1977 | Schatz | 235/487 |
| 4,004,133 | 1/1977 | Hannan | 235/485 |
| 4,007,355 | 2/1977 | Moreno | 235/385 X |
| 4,020,326 | 4/1977 | Coulthurst | 235/487 |
| 4,091,448 | 5/1978 | Clamsing | 364/200 |
| 4,092,524 | 5/1978 | Moreno | 236/419 |
| 4,094,462 | 6/1978 | Moschner | 235/380 |
| 4,102,493 | 7/1978 | Moreno | 235/419 |
| 4,105,156 | 8/1978 | Dethloff | 235/441 |
| 4,114,027 | 9/1978 | Slater et al. | 235/419 |

FOREIGN PATENT DOCUMENTS

| | | | |
|---|---|---|---|
| 2266222 | 10/1975 | France | 235/487 |
| 2304989 | 10/1976 | France | 235/487 |
| 2304992 | 10/1976 | France | 235/487 |

OTHER PUBLICATIONS

"New Encoding Methods", Control Engineering, Oct. 1979, pp. 88-94.

"Credit Card Bearing Mechanically Recorded Data", RCA Technical Note #956, Mar. 15, 1974.

*Primary Examiner*—G. Z. Rubinson
*Attorney, Agent, or Firm*—Lowe, King, Price & Becker

[57] ABSTRACT

Each card of a set of credit cards includes a memory having plural memory fields. The memory of each card in a set includes a first unalterable multi-bit field indicative of an identification of an external means with which the card can be used, as well as a second unalterable multi-bit field indicative of operations that can be performed with the card on the external means and an alterable multi-bit field indicative of the number of credit units available to a card holder. Each card includes circuits for controlling the memory, and means for temporarily coupling the memory and circuits to the external means. Each of the first and second unalterable bit fields includes n bits. A change from one bit state to the other bit state of a predetermined number, m, of bits in the unalterable fields of each card in the set is irreversible after imprinting, where m is equal to or less than n.

3 Claims, 19 Drawing Figures

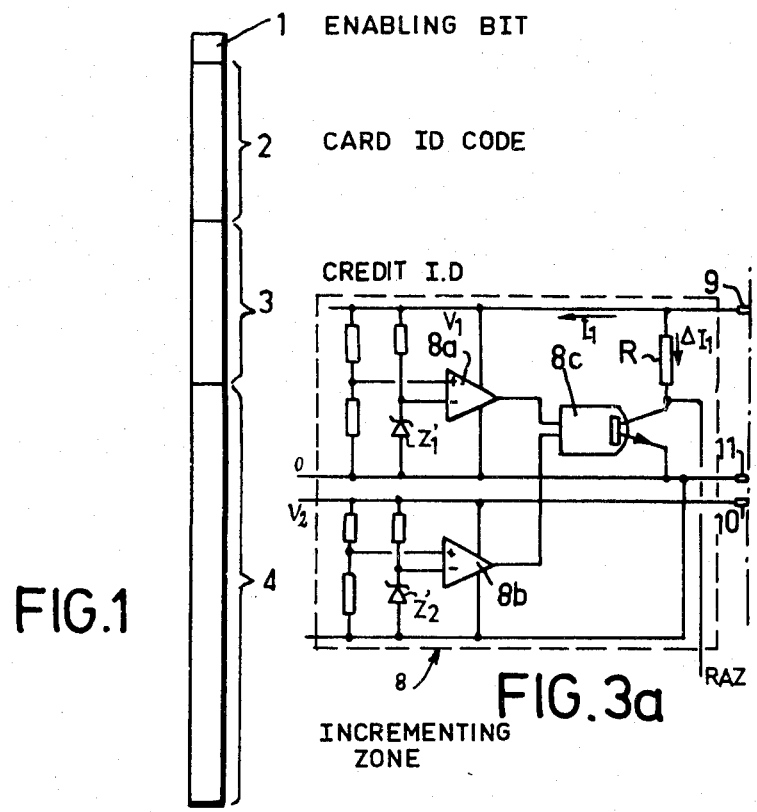
FIG.1
FIG.3a
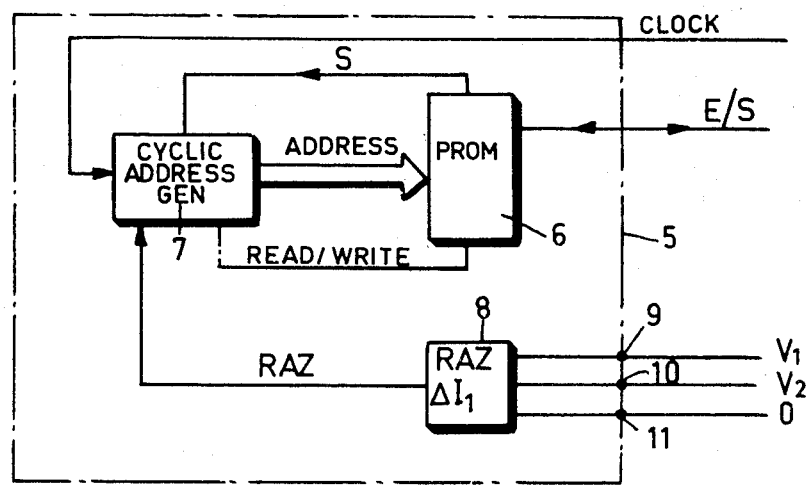
FIG.2

COMMUNICATION WITH THE OPERATOR

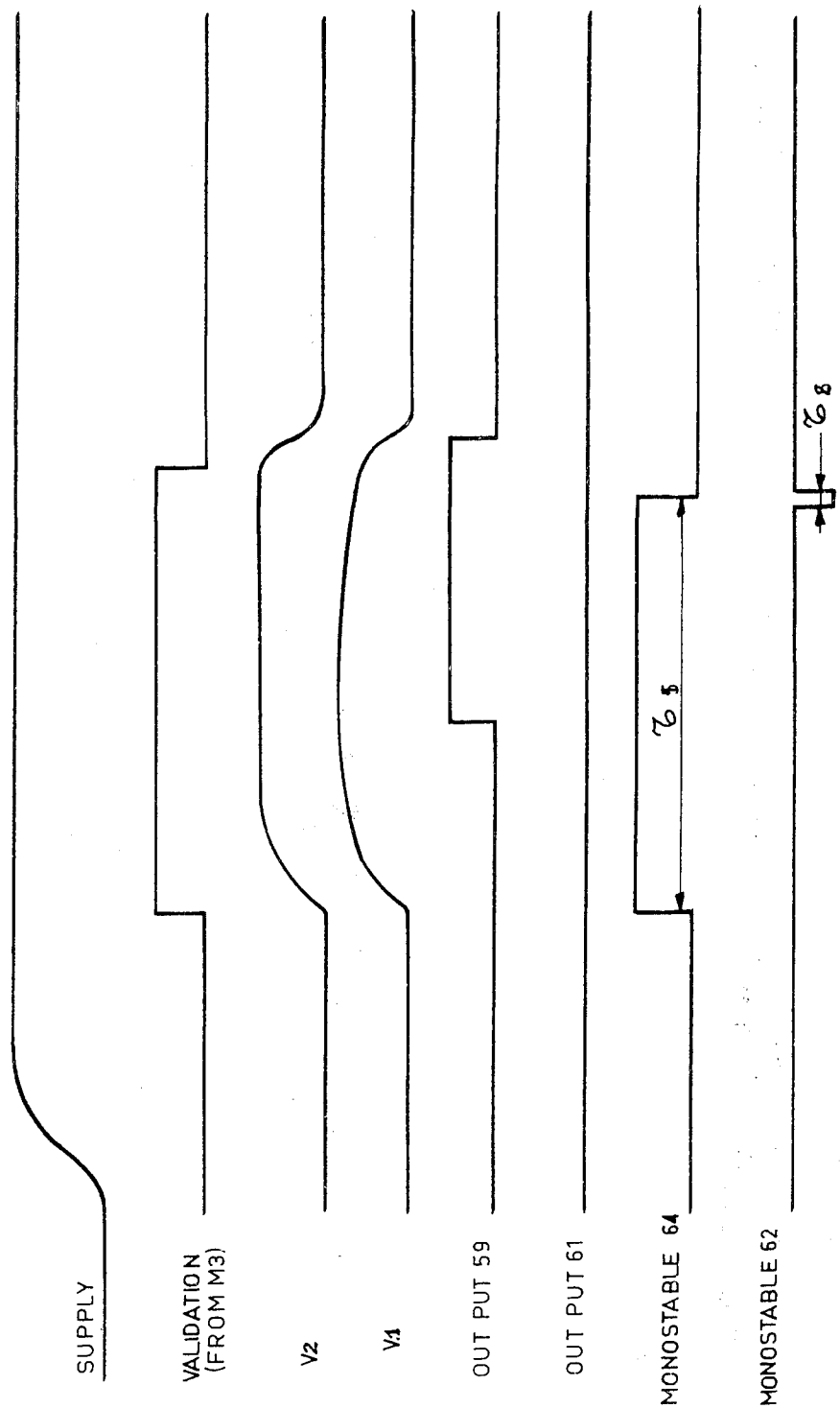

SYSTEM FOR KEEPING ACCOUNT OF PREDETERMINED HOMOGENEOUS UNITS

This is a continuation, of application Ser. No. 889,517 filed 3/23/78, now U.S. Pat. No. 4,256,955.

FIELD OF THE INVENTION

The present invention relates to credit cards and more particularly to a credit card including at least one unalterable bit field containing a predetermined number of bits in an irreversible state.

SUMMARY OF THE INVENTION

An object of the invention is to provide a recording or transaction medium capable of recording whole numbers of units. The medium is used to note and keep a record of data involved in transactions which take place to verify or check that the holder of an article can perform an operation prior to an operation which has been requested. The applications are many; they may, for example, be to record jobs done (in time or units) or to record quantities of goods or services supplied or received (for example by connection to a volume counter) and so on, with a view either to paying in or paying out or more simply for easy and reliable record keeping.

Because the most obvious applications of the invention are for payment of goods or services where the handling of cash or transferable money is eliminated, for greater clarity the remaining description of the invention relates to situations where payments equivalent to cash payments and not specific to an individual are made. The reader will realize that the medium which forms the subject of the invention may equally well be made specific to an individual in various fashions (by the imprinting of a name or confidential code or a key which enables a confidential code to be checked with a view to authorizing access) or may be used in situations which do not necessarily involve the movement of money in one direction or another.

To this end, an object of the invention is to provide an article for keeping account of predetermined homogeneous units, wherein the article carries information to be coupled to an external means for imprinting and/or operating on the said information. The article incorporates a memory and circuits for controlling the memory.

The article is temporarily coupled to the external imprinting and/or operating means, which reads data from and writes data into the memory of the article.

The article memory contains three types of coded information, viz.:

(1) an identification of the use for which the article is intended, (2) the identity of the units used to keep account of the operations which are performed, and (3) the number of units available to the holder of the article.

The imprinting and/or operating means writes into the article memory the number of units required or received by the holder of the article, within the limits of the capacity of the memory, and/or reduces the number of units by the number of units received or required by the holder of the article.

In the context of a case where, for example, the invention is applied to the supply of services or goods, such as telephone calls, postage stamps, etc., the user obtains an article, such as a card, in exchange for payment in cash or transferable money of a sum corresponding to the total amount of the goods or services required. The user obtains the card from a given point, depending upon the nature of the goods or services required. At the point where the card is purchased, the total amount is recorded in coded language on the card as a number of equal and separate units.

The card may or may not be made "bearer only," that is, it may or may not be personalized, but it may only be used in connection with apparatus provided for the purpose of the purchase.

The card is very simple to use because it need merely be inserted into an operating apparatus associated with the particular services or goods. The card and the apparatus must be compatible and the number of service or goods units required must not exceed the number of units available on the card.

When the above criteria have been satisfied, the required services of goods are supplied, resulting in cancellation of a certain number of the available units on the card. The credit on the card is thus debited by a quantity corresponding to the sum of the service or goods supplied. The card, once exhausted, can no longer be used and is returned by the user when a fresh card is purchased. The memory of the card is incapable of reuse once completely decremented, that is, once all of the available units imprinted at the time of purchase have been competely used.

Preferably, for security purposes, all or some of the information recorded in the memory is coded in an unalterable code in which each type of information is expressed in a field of n binary bits. M of the n bits in the field can be irreversibly changed after being initially imprinted, where m is less than or equal to n and is fixed in advance.

With such coding, any interference, i.e., tampering with the coded information, can result only in binary configurations which are meaningless to the operating apparatus of the invention.

The above and still further objects, features and advantages of the present invention will become apparent upon consideration of the following detailed description of one specific embodiment thereof, especially when taken in conjunction with the accompanying drawings.

BRIEF DESCRIPTION OF THE DRAWINGS

FIG. 1 is a diagram of a layout of the information content of an article according to the invention;

FIG. 2 is a logic diagram of circuits carried by the article;

FIG. 3a is a detailed logic diagram of part of the circuitry of FIG. 2;

FIG. 14 is a timing diagram of signal waveforms which occur when voltages V1 and V2 are applied but are not received by the article;

DETAILED DESCRIPTION OF THE DRAWINGS

Figure 3:
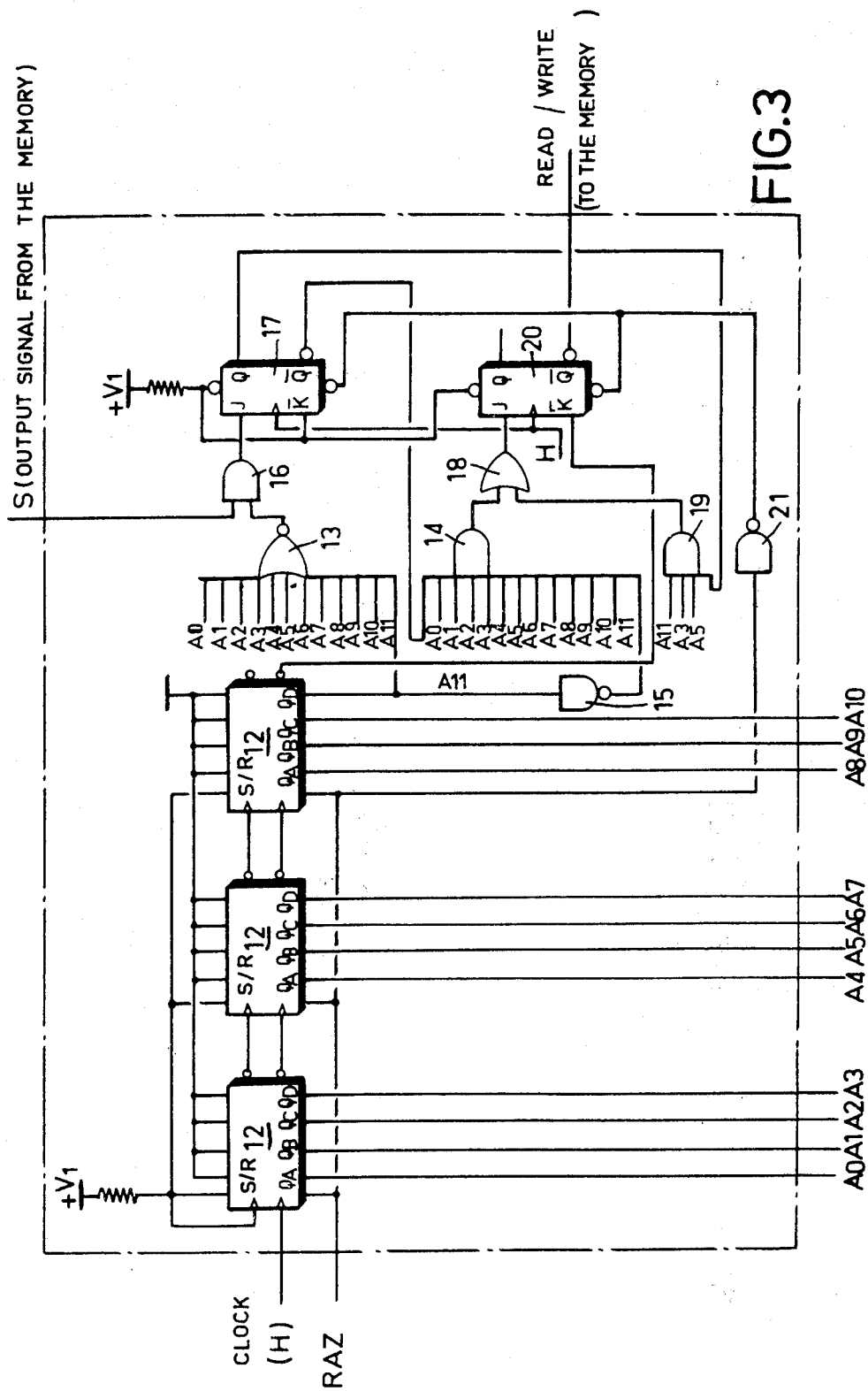
FIG. 3 is a more detailed logic diagram of part of the circuitry of FIG. 2.

The invention will now be described in one of its applications, i.e., applying payment for given goods or services by means of a medium which bears a quantifiable credit, i.e., a balance. In this application, an article such as a credit card, is supplied with signals indicating the purchase of predetermined goods or services by the article holder; signals indicative of the resources of the article holder are also stored in the article. Signals to debit the article by an appropriate amount, indicative of the purchase, are also supplied to the article. The system also includes an apparatus for establishing a predetermined credit beforehand on a blank medium for the given type of service or goods, in exchange for an appropriate amount in cash or transferable money.

By way of illustration, one may refer to the application of such a system to telephone services. The credit-bearing medium would be formed by a card, similar to a credit card, carrying a fixed code identifying the card, a fixed code relating to the nature of the service capable of being provided (geographic zones and charges), and an alterable code relating the number of payment credit units available to the card holder.

FIG. 1 is a diagram of the format of information stored on an article, such as a credit card, according to the invention. This information is stored in binary form. At the top of the card in zone 1 is recorded an enabling bit, such as a binary 0 to indicate a blank card or a binary 1 to indicate a usable card. At zone 12 is recorded a card identification code which enables the card to be used in only certain, suitable operating apparatus. At zone 3 is recorded a code for identifying the credit value unit of the card, and finally at zone 4, is an incrementation zone of n bits, each bit having a value which is identified by the identification code of the unit U. Each debit of nU from the card corresponds to the credit of nU to the apparatus operating on the card.

The codes at zones 2 and 3 must be unalterable, that is, they cannot be interfered with in such a way as to convert a given code recognized by operating apparatus according to the invention into another code which is similarly recognized by the apparatus but which has been allotted to goods or services of another kind.

To this end, the codes of zones 2 and 3 include fields of n bits in which a changeover of each bit from one binary state to the other is irreversible. Thus, if, for example, the only possible changeover is from a 0 bit to a 1 bit, it is merely necessary to set a predetermined maximum number for the 1 bits in each field. This maximum number of 1 bits is inserted into each code that can be recognized by the apparatus of the invention.

In this way, the codes at zones 2 and 3 can only be illicitly altered by adding an extra 1 bit, it being impossible to change from a 1 bit to a 0 bit. Adding the extra 1 bit produces a code having a number of 1 bits greater than the pre-established maximum number, with the result that the new code does not belong to the group of codes that can be recognized by apparatus with which the card is used. This requires a card memory which is either intrinsically irreversible (a destroyed-junction memory for example) or one which cannot be reversed by external means. Hence, the card must include circuits and cannot merely store signals, as is done by a magnetic strip.

FIG. 2 is a logic diagram of circuits carried by credit card 5 that is adapted to be used with the invention. These circuits include a programmable memory 6 of the PROM type, which is addressed by a cyclic address generator 7 which receives synchronizing signals from a clock (external to the card). The memory 6 is able to communicate with the signal sources external to card 5 via a data input/output terminal E/S.

A read/write signal for the memory 6 is generated by its address generator 7. The address generator 7 is reset to zero when voltage is applied by signal RAZ, generated by circuit 8. Circuit 8 has three terminals which may be connected to an external device. Between first and second terminals or contacts 9 and 11 of circuit 8 is applied a DC power supply voltage V1 for logic circuits of the card 5. Between a third terminal or contact 10 and terminal 11 of circuit 8 is applied a different voltage V2 that programs memory 6. Circuit 8 also generates a signal $\Delta I1$ which is detected by a means (described infra) that imprints information on the card or that operates on the card.

FIG. 3 is a logic diagram of address generator 7, FIG. 2, that drives PROM 6, a 2048 bit memory which requires an eleven bit input address (A0 to A10). For this purpose, address generator 7 contains a counter formed by three cascaded, four stage shift registers which generate the address signals A0 to A10 in response to clock signals (H). The registers 12 are reset to zero by signal RAZ. The 12 outputs (A0–A11) of registers 12 include NOR gate 13 and AND gate 14. Gates 13 and 14 respond to outputs A0–A10; output A11 of register 12 is connected directly to an input of NOR gate 13 and, via inverter 15, to an input of AND gate 14.

The output of NOR gate 13 is connected to an input of AND gate 16, having another input responsive to the output signals S from memory 6. The output of AND gate 16 drives the J input of a JK flip-flop 17 so that the flip-flop stores the zero bit state when the counter 12 changes over to address zero.

The output of AND gate 14 is connected to an input of an OR gate 18, having a second input connected to the output of AND gate 19. The output of OR gate 18 is connected to drive the J input of a second JK flip-flop 20 which emits read/write signals that are supplied to memory 6. Flip-flops 17 and 20 are reset to zero by signal RAZ via an inverter 21 and are controlled by the clock signals H.

FIG. 3a is a detailed diagram of circuit 8 of card S. Circuit 8 supplies a zero-resetting signal RAZ to address generator 7 when voltage V1 is applied between terminals 9 and 11. Circuit 8 also generates a signal which is supplied to and detected by an external device dialoguing with the card; this signal advises the external device that the voltages V1 and V2 are being properly received by the card during the entire duration of the dialogue with the external device.

For this purpose, circuit 8 includes two voltage comparators 8a and 8b (of the voltage hysteresis kind to avoid oscillator) which respectively compare the potentials V1 and V2 (between leads 9 and 11, and leads 10 and 11, respectively to reference potentials supplied by Zener diodes Z'1 and Z'2. Comparators 8a and 8b derive binary signals dependent on the relative amplitudes of the signals applied to the inputs thereof. The output signals of comparators 8a and 8b are combined by a normally open-collector NAND circuit 8c, which is connected to voltage V1 by a resistor R such that:

$R = (V1/\Delta I1)$.

Figure 8:
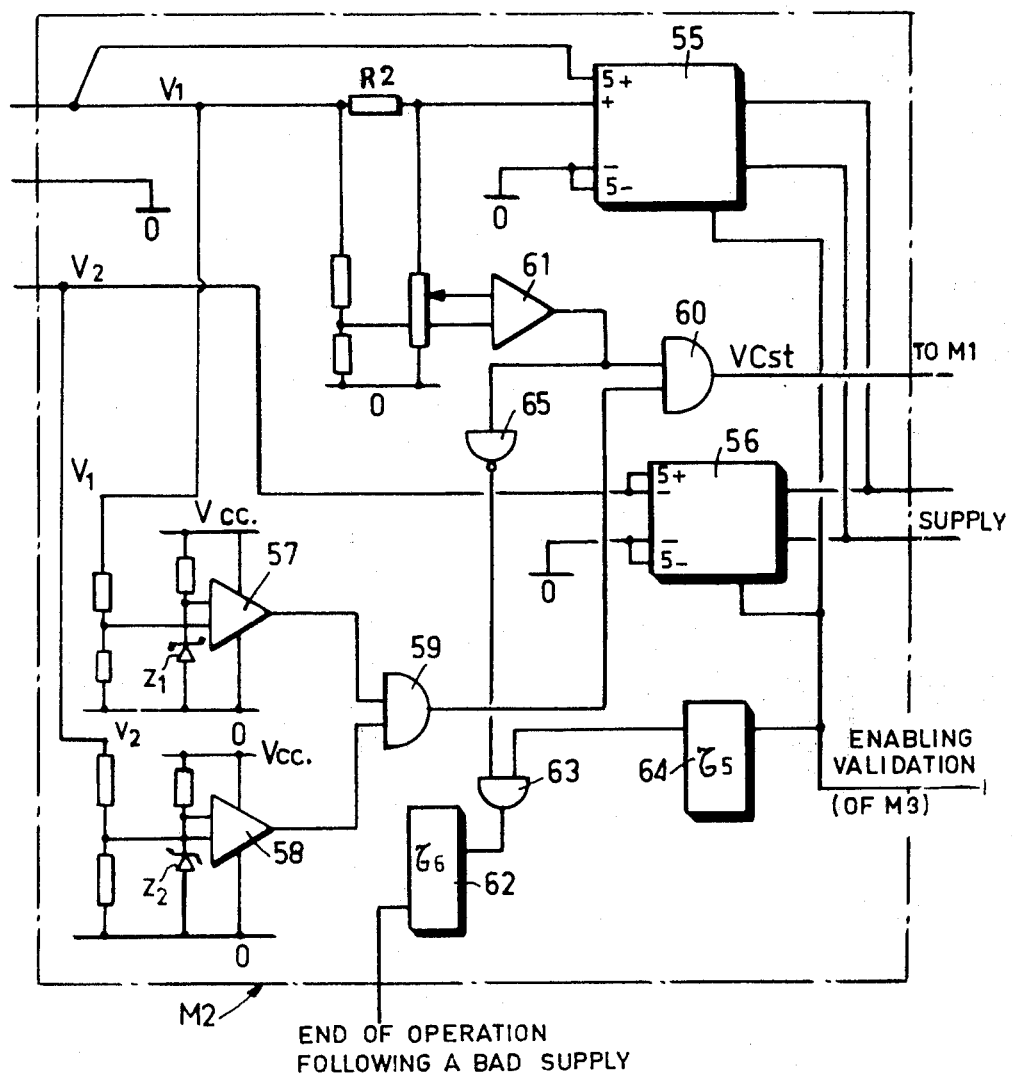
FIG. 8 is a diagram of the means for supplying power to the article.

The detection of current I1 is performed by voltage supply M2 (see FIG. 8). In response to V1 and V2 both being respectively greater than the reference voltages of Zener diodes Z'1 and Z'2, the current through resistor R decreases by $(V1/R)$.

Figure 4:
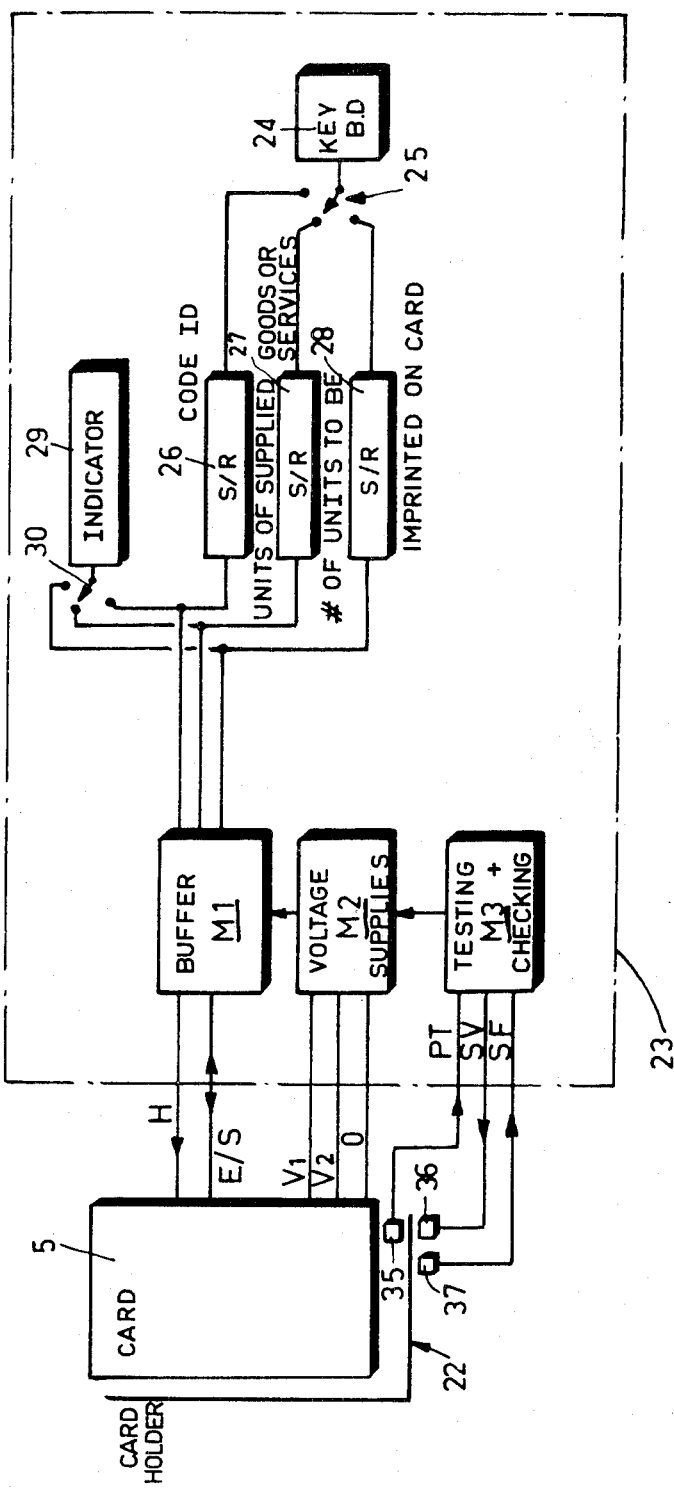
FIG. 4 is a logic diagram of a means for imprinting data into a memory of the article.

FIG. 4 is a diagram of a device for imprinting signals on the circuits of card 5 at the time the card is initially purchased. Holder 22 accepts the card 5 in an appropriate position to enable the card to exchange data with a card imprinting network 23. Holder 22 is described infra with reference to FIG. 6.

Imprinting network 23 includes buffer M1 which exchanges data signals E/S with card 5 and feeds clock signals H to the card, a source M2 for feeding voltages V1 and V2 to the card, and circuit M3 for testing and checking card 5.

Testing and checking circuit M3 assures that card 5 is properly positioned in its holder 22 by generating signals Pt, Sv and Sf, described infra. An operator communicates with card 5 via keyboard 24, connected to selector switch 25. Selector switch 25 is in turn connected to: a first shift register 26 that supplies a code identifying signal to card 5, a second shaft register 27 that supplies the card switch with a signal identifying the credit unit with which the card can be used, and a third shift register 28 that supplies a signal to card 5 to indicate the desired credit for the card holder. A display device 29 is selectively connected through switch 30 to enable the content of each register 26 to 28 to be displayed. Apparatus 23 includes power supply means, not shown.

Figure 5:
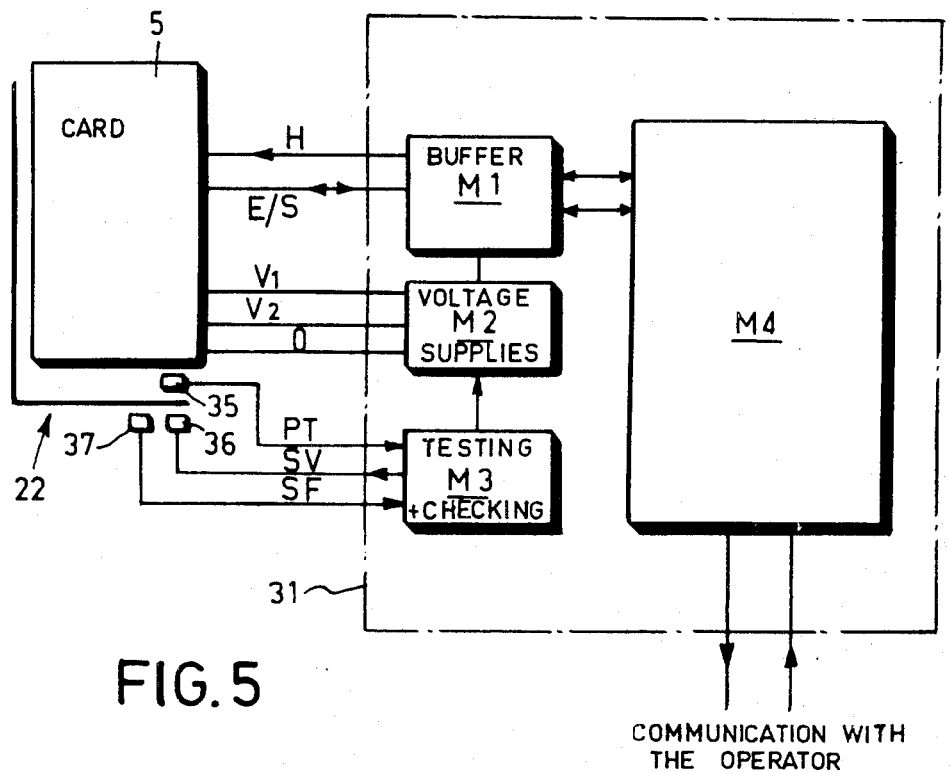
FIG. 5 is a logic diagram of a means for using the article.

FIG. 5 is a block diagram of apparatus 31 that enables a card holder to communicate with card 5 and activate a device for the goods or services associated with the card. The apparatus 31 includes a number of elements identical to those of the apparatus of FIG. 4 and these bear the same reference numerals. These identical elements are holder 22 for the card, and card checking and testing circuits M3.

In addition, apparatus 31 includes a buffer M'1 for dialoguing with card 5 and circuit M4 for checking the credit on the card and determining whether the card is compatible with the service requested. As in the case of the apparatus of FIG. 4, circuit M4 includes a first register to identify the code on the card, a second register for identifying the unit of credit associated with the card, and a third register for supplying a signal to the card for the debit to be recorded on the card. These three registers, which are identical to registers 26, 27 and 28 of FIG. 4, are not shown in FIG. 5. Also provided are display means (not shown) identical to the display 29 of FIG. 4. Circuit M4 is connected to buffer M'1 and to a keyboard (not shown) that communicates with the operator. Apparatus 31 also includes a power supply (not shown) for the various circuits.

Figure 6:
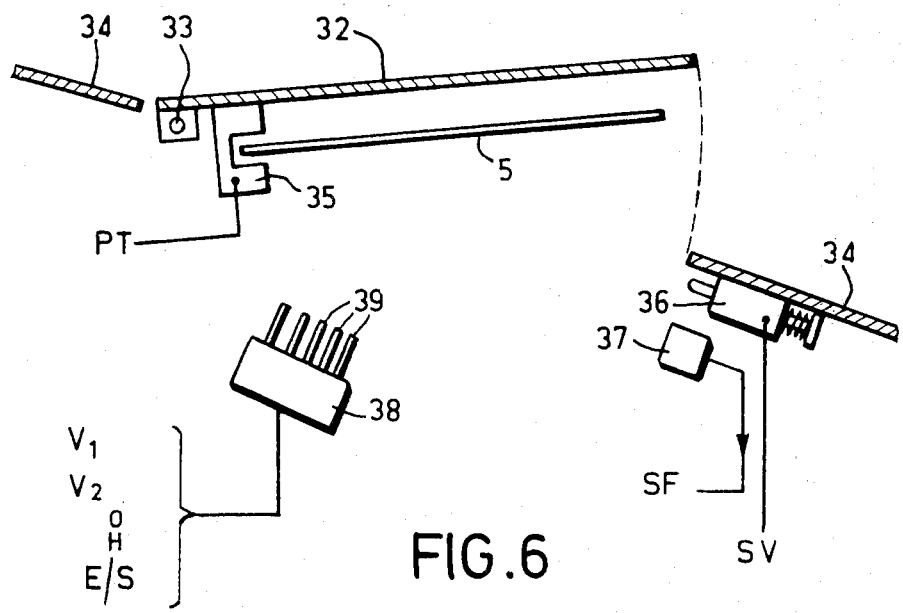
FIG. 6 is a schematic view of part of the means for imprinting and using the article.

FIG. 6 is a highly schematic diagram of an illustrative embodiment of the holder 22 and part of checking and testing circuit M3 for card 5.

In FIG. 6 there is shown a flap 32 which is pivotable about an axis 33 and biased open by a spring (not shown). Card 5 is inserted under the flap 32, through an opening formed in a plate 34, unitl it abuts against presence detector 35 (of known type) that responds to the presence of card 5 by supplying a signal DT to testing circuit M3. Underneath plate 34 and lying opposite the card 5, when flap 32 is closed, are: spring catch 36 which is responsive to a locking signal SV derived from circuit M3, and a detector 37 for detecting closure of flap 32. Detector 37 supplies a signal SF to testing circuit M3. When flap 32 is closed, there is situated below card 5 a head 38 having five pins 39 capable of making contact with suitable contacts carried by the card, to provide exchanges between the card and the apparatus 23 and 31 that respectively imprints the cards and allows them to be used. Signals and power supply voltages are read out from and supplied to pins 39 by buffer M1 and source M2.

Figure 7:
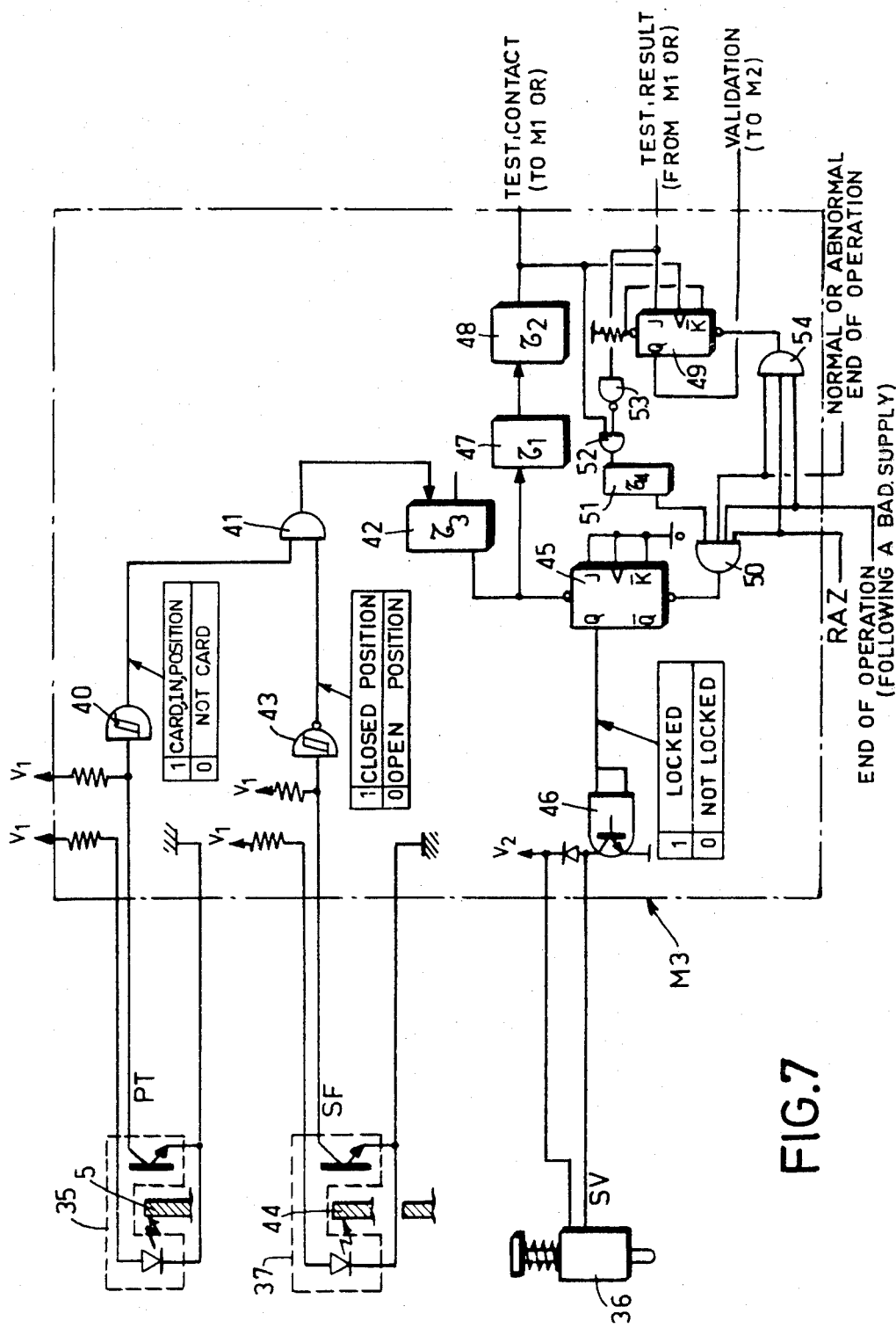
FIG. 7 is a logic diagram of means for checking the article.

FIG. 7 is a more detailed logic diagram of the circuit M3 for testing and checking cards. Presence detector 35 is a photo-electric cell detector that emits a signal PT when the edge of the card 5 is inserted in a horseshoe shaped space between a light emitting diode and a phototransistor. Signal PT is transmitted to a pulse-shaper 40 which is in turn connected to one input of AND gate 41, having a second input responsive to signal SF as coupled through inverter 43. Detector 37 is similar to detector 35 and emits a signal SF when the flap 32 is in the open position, as represented by a sheet 44 attached to flap 32 being situated in the horseshoe shaped space in detector 37. When the flap is closed, sheet 44 is clear of the horseshoe space. The output of gate 41 is applied to monostable flip-flop 42, which generates a negative going pulse of length $\tau 3$. The catch 36 responds to a binary locking signal SV supplied to it by a JK flip-flop 45, via a control and amplifying circuit 46.

Output signal $\tau 3$ of monostable 42 drives an input of monostable 47, which emits a pulse of length $\tau 1$ and drives a monostable 48 which emits a pulse of length $\tau 2$. The output of monostable 48 is transmitted to buffer M1 or M'1 to command testing of contacts 9-11 on the card 5.

The signal $\tau 2$ from monostable 48 is also supplied to a trigger input of JK flip-flop 49; the J input of flip-flop 49 is responsive to an output signal of buffer M1 or M'1 which indicates the test result for the contacts 9-11 of card 5. Flip-flop 49 derives an enabling signal for power source M2.

Flip-flop 45 is reset to zero by the output of AND gate 50, having four inputs, viz.: a zero-reset initializing input RAZ; the RAZ signal is derived from power source M2 to indicate the termination of operations as a result of a defective power supply; inputs to signal the normal and abnormal termination of operations; signals derived from buffer M1 or M'1; and a fourth input responsive to a monostable 51 which emits a pulse of length τ4.

Monostable 51 is controlled by an AND gate 52, having one input responsive to the output of monostable 48 and another input coupled via inverter 53 to a test indicating signal derived from buffer M1 or M'1.

Flip-flop 48 is reset to zero by the output of AND gate 54, having only three inputs which are common to the first named three inputs of AND gate 50.

FIG. 8 is a circuit diagram of power supply M2 for card 5. Supply M2 includes two DC voltage sources 55 and 56 which, when enabled by a binary one enabling signal from testing circuit M3, respectively derive voltages V1 and V2 from a common power supply (not shown). The presence and values of voltages V1 and V2 are also detected by supply M2.

To these ends, voltage comparators 57 and 58 respectively detect the presence of DC voltges V1 and V2. Comparators 57 and 58 are fed with a DC voltage Vcc which also biases Zener diodes Z1 and Z2 to requisite reference potentials. In response to V1 and V2 being greater than the reference potentials of Zener diodes Z1 and Z2, comparators 57 and 58 respectively supply binary one signals to enable AND 59 which in turn enables AND gate 60 to be responsive to the output of voltage comparator 61 that detects the current change $\Delta II$ that is supplied to R2 by circuit 8 on card 5 when conditions are correct. The potential difference $\Delta II$. R2 is applied via two resistive voltage dividers to the input of comparator 61. In response to AND gate 60 being enabled by the output of gate 59 while comparator 61 senses $\Delta II$, gate 6 supplies a binary one signal to buffer M1 or M'1.

Power source M2 emits a signal if operations terminate because of a poor power supply; this signal, generated by a monostable 62, has a pulse of length τ6 and is supplied to testing circuit M3. Monostable 62 is excited by an AND gate 63, having inputs responsive to the output of comparator 61, while monostable 64 generates a pulse of length τ5 in response to an enabling signal from testing circuit M3.

Figure 9:
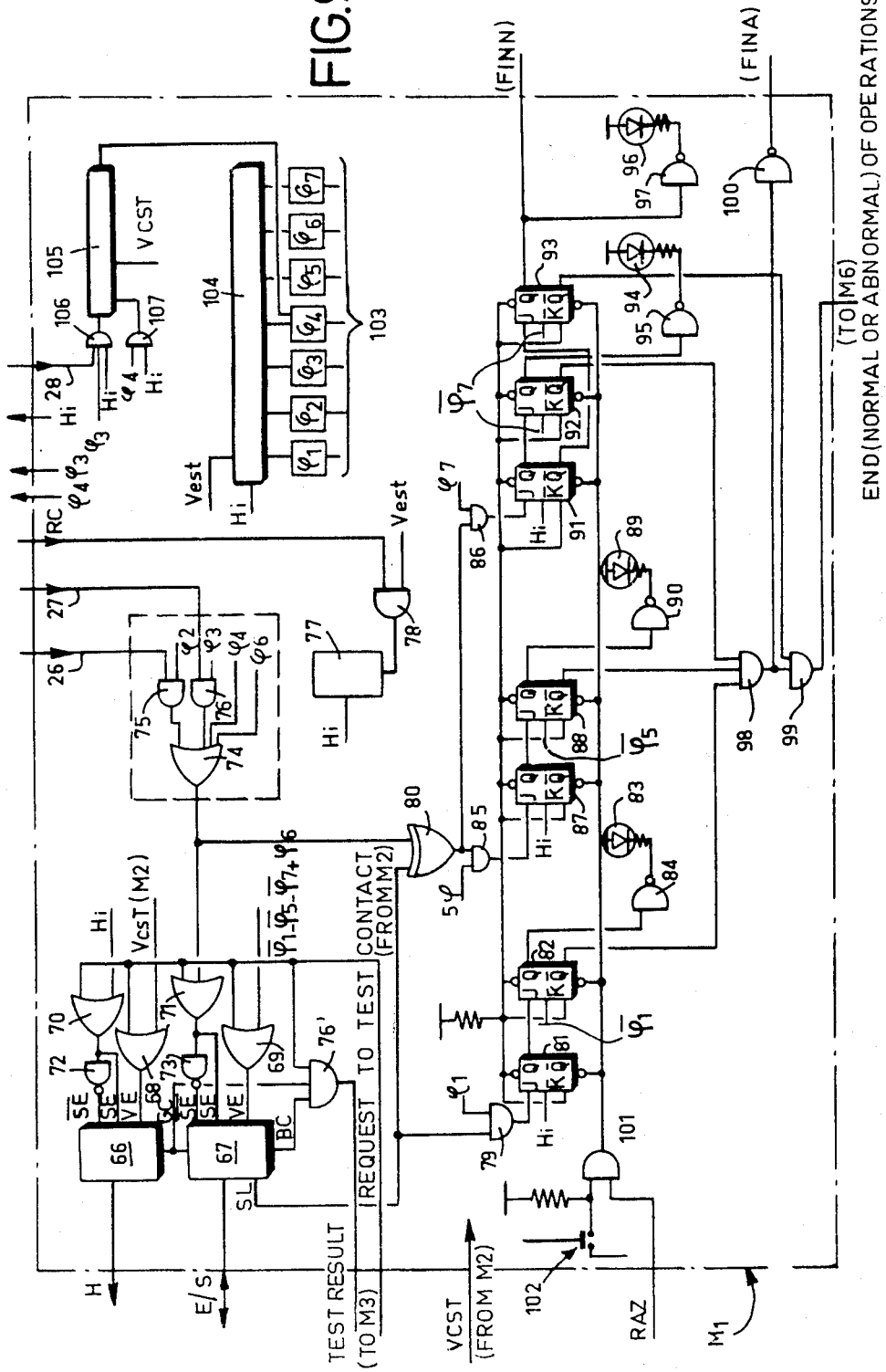
FIG. 9 is a logic diagram of a means for performing dialogues between the machine of FIG. 4 and the article.

FIG. 9 is a circuit diagram of buffer M1 that controls dialogues between circuit M4 and card 5. Clock signals H, derived by buffer M1 are generated by checking circuit 66 in response to clock signals Hi in response to signal Vcst from supply M2 indicating V1 and V2 are within the normal range while the current $\Delta II$ has the request value and in response to supply M2 indicating that a contact request has been made.

An exemplary checking circuit 66 is disclosed in French patent application No. 77.03317, commonly assigned with the present application, filed Feb. 7, 1977, entitled "Arrangement for Checking a Contact Inserted Between a Transmitter Circuit and a Receiver Circuit, to Allow Electrical Signals to be Transmitted."

Buffer M1 communicates with card 5 via signals E/S, generated by circuit 67, identical to member 66. Circuits 66 and 67 are respectively enabled by output signals from OR gates 68 and 69. Both OR gates 68 and 69 respond to "contact-test request" signals from testing and checking circuit M3. The other input of OR gate 68 receives a signal Vcst from voltage supply M2, while the other input of OR gate 69 receives phase signals $\phi'1$, $\phi'5$, $\phi'7$ and $\phi'6$, described infra.

Circuits 66 and 67 respectively respond to output signals of OR gates 70 and 71, which also supply the enabling signals that are fed to circuits 66 and 67 via inverters 72 and 73 respectively. OR gates 70 and 71 respond to the "contact-test request" signals derived from supply M2; gate 70 also responds to clock signal Hi from circuit 77 while gate 71 responds to data writing signals derived from a four-input OR gate 74. Clock signal Hi is derived from clock source 77, when the source is enabled by a signal RC (indicating that registers 26, 27 and 28 have been loaded) and by signal Vcst from supplier M2.

First and second inputs of OR gate 71 are coupled to outputs of registers 26 and 27 (FIG. 4) in response to AND gates 75 and 76 being enabled by phase displaced timing signals $\phi'2$ and $\phi'3$, respectively. Third and fourth inputs of OR gate 71 respectively respond to phase displaced timing signals $\phi'4$ and $\phi'6$. As described infra, there are seven phase displaced signals $\phi'1-\phi'7$, each having the same frequency that is a sub-multiple of clock source Hi.

Each of circuits 66 and 67 derive a separate "good contact" signal BC; both of signals BC are supplied to AND gate 76; enabled by a signal from supply M2 requesting the contacts to be tested.

Circuit 67 responds to the contents of registers 26 and 27, as fed through gates 71, 73, 74, 75 and 75', to derive a signal SL that indicates the contents of memory 6 and is fed in parallel to AND gate 79 and exclusive OR gate 80. AND gate 79, when enabled by a timing signal of phase $\phi'1$. supplies a signal to a J input of JK flip-flop 81, having a direct (Q) output that drives a J input of a second JK flip-flop 82, having a direct (Q) output which selectively energizes a light emitting diode 83 via an inverter 84.

Exclusive OR gate 80 compares the SL output circuit 67 with the output of OR gate 74 and drives AND gates 85 and 86, respectively enabled by timing signals of phases $\phi'5$ and $\phi'7$. The output of AND gate 85 is applied to the J input of JK flip-flop 87, having a Q output that drives the J second input of JK flip-flop 88, having a Q output which drives light emitting diode 89 via inverter 90. AND gate 86 drives the J input of JK flip-flop 91, having Q and $\overline{Q}$ outputs respectively drive a J input of JK flip-flop 92 and a J input of JK flip-flop 93. The Q output of JK flip-flop 92 feeds light emitting diode 94 via inverter 95. The Q output of JK flip-flop 93 emits a signal FINN, to indicate the normal termination of operations, and which is coupled to light emitting diode 96 via an inverter 97.

The complementary $\overline{Q}$ ouptuts of JK flip-flops 82, 88 and 92 are combined in AND gate 98, having an ouput supplied in parallel to AND gate 99 and an inverter 100 that derives a signal FINA to indicate abnormal termination of operations. AND gate 99 also responds to the $\overline{Q}$ output of JK flip-flop 93 to derive signal FIN that is fed as a disabling signal to supply M3.

JK flip-flops 81, 82, 87, 88, 91, 92 and 93 are reset to zero by a signal RAZ when the equipment is switched on; signal RAZ is supplied to reset inputs of these flip-flops via an AND gate 101, enabled by manually controlled push button 102.

Phase displaced timing signals $\phi'1-\phi'7$ are derived at outputs 103 of shift register 104 which responds to clock signals Hi and is enabled by signal Vcst.

Register 28 (FIG. 4 and not shown in FIG. 9) drives shift register 105. When enabled, shift register 105 operates as a forward counter driven by AND gate 106, which is enabled by clock signal Hi and signal φ'3; register 105 operates as a backward counter when enabled by AND gate 107 that is driven by signals Hi and φ'4. Register 105 sets register 104 so that a timing signal of phase φ'4 is derived from the latter when the former derives a signal.

Figure 10:
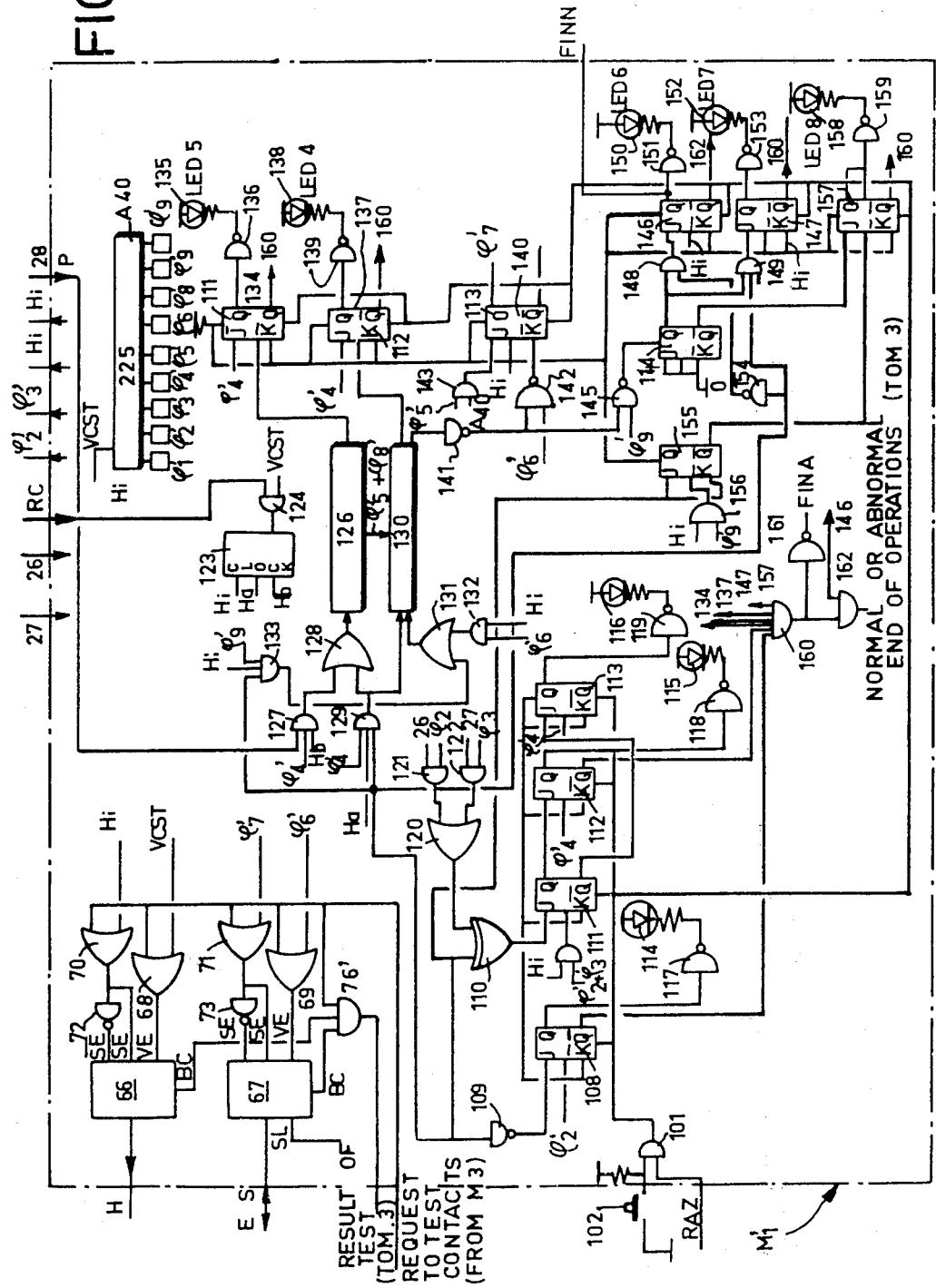
FIG. 10 is a logic diagram of a means for performing dialogues between the machine of FIG. 5 and the article.

In FIG. 10 is shown the circuitry for communicating between the machine of FIG. 5 and card 5. Some of these circuits, namely circuits 66 and 67 and their gate circuits, are the same as corresponding circuits of buffer M1 that supplies initiallizing signals to the card, as illustrated in FIG. 9; these circuits have the same reference numerals in the two Figures. Signal SL from circuit 67 (FIG. 9) responsive to the request to test contacts signal VE from testing circuit M3, is transmitted to the J input of JK flip-flop 108, via inverter 109, and to exclusive OR gate 110 having an output applied to the J input of a JK flip-flop 111, in turn having Q and $\overline{Q}$ outputs respectively connected to the J inputs of JK flip-flops 112 and 113. The Q outputs of flip-flops 108, 112 and 113 respectively energize light emitting diodes 114, 115 and 116 via inverters 117, 118 and 119.

The circuit of FIG. 10 includes a clock-signal generator 123, enabled by an AND gate 124, in turn responsive to signal Vcst and signal RC, which indicates that registers 26–28 are loaded. The generator 123 generates the clock signal Hi, as well as clock signals Ha, Hb, respectively synchronized with the leading and trailing edges of pulses Hi. Phase generator 125 is formed by shift register 225, responsive to clock signal Hi and signal Vcst. Phase generator 125 generates phase displaced timing signals φ'1 to φ'6, φ'8, φ'9, and address signal A40, all having the same frequency.

A second input of exclusive OR gate 110 is connected to the output of OR gate 120, driven by AND gates 121 and 122; gate 121 responds to signal φ'2 and the output of register 26, while gate 122 responds to signal φ'3 and the output of register 27.

The number of bits, N, to be altered in memory 6 of card 5, as indicated by register 28, is transmitted from the register to counter 126 via AND gate 127 and OR gate 128. Gate 127 responds to signal φ'4 and Hb, while gate 128 responds to a signal from AND gate 129, in turn responsive to signals φ'4, Ha and SL.

The contents of counter 126 are selectively fed in parallel to counter 130, when the latter is enabled by an input from either AND gate 129 or OR gate 131. OR gate 131 is responsive to AND gates 132 and 133; gate 132 responds to signals Hi and φ'6, while gate 133 is supplied with signals φ'9, Hi and SL. An overflow output of counter 126 drives the toggle input of JK flip-flop 134, having a Q output that drives LED 135 via inverter 136, whereby illumination of the diode indicates overflow of counter 126. The J and K inputs of flip-flop 134 respectively respond to signals φ'4 and φ'6, while the set input of this flip-flop responds to signal φ'6. An overflow output of counter 130 drives the K toggle input of JK flip-flop 37 which feeds light emitting diode 138 via an inverter 139. The K and set inputs of flip-flop 137 respond to signal φ'6, while the set input of this flip-flop responds to signal φ'6.

The overflow output of counter 139 also drives the K input of JK flip-flop 140, via inverter 141 and NAND gate 142, having a second input responsive to φ'5. The J input of flip-flop 140 responds to the output of AND gate 143, in turn responsive to signals φ'5 and A40; at the Q output of flip-flop 140 is generated the phase signal φ'7. The trigger input of flip-flop 140 responds to clock signal Hi.

The output of inverter 141 is also coupled to the set input of JK flip-flop 144, via NAND gate 145, having another input responsive to φ'9. The Q output of flip-flop 144 drives the J inputs of JK flip-flops 146 and 147, via AND gate 148 and 149, respectively responsive to signals $\overline{SL}$ and SL as derived from inverter 154 and circuit 67; inverter 154 responds to the SL output signal of circuit 67. The Q outputs of flip-flops 146 and 147 respectively feed light emitting diodes 150 and 152 via inverters 151 and 153.

The SL signal from circuit 67 is also respectively supplied to the J and K inputs of JK flip-flop 155, having set and toggle inputs respectively responsive to signal φ'6 and the output of AND gate 156; the latter is responsive to signals Hi and φ'9. The $\overline{Q}$ output of flip-flop 155 is connected to the toggle input of JK flip-flop 157, having a Q ouput which drives light-emitting diode 158 via inverter 159. Flip-flops 134, 137, 140, 144, 146, 147, 155 and 157 are all reset to a zero state in response to AND gate 101 deriving a binary one output when signal RAZ is derived while contacts 102 are closed.

Finally, AND gate 160 combines the $\overline{Q}$ outputs of flip-flops 108, 112, 134, 137, 147 and 157. The output of AND gate 160 is supplied to inverter 161 which generates a signal FINA to indicate abnormal termination and to an AND gate 162, having a second input responsive to the $\overline{Q}$ output of flip-flop 146. Gate 162 derives normal and abnormal termination signals which are supplied to testing and checking circuit M3.

The manner in which the above system operates will now be described with reference to FIGS. 1 to 10, and also to FIGS. 11 to 18 which are diagrams of the various signals employed in the system. The operation of the apparatus for printing information on card 5 will be described in connection with the previously mentioned example, relating to telephone systems.

Actions performed by the user of the system are as follows:

(1) the purchase of card 5 at an appropriate sales outlet, such as a post office. This purchase involves imprinting on the card a credit of n units, as required by the purchaser (n being equal to or less than the capacity of the memory of the card). Imprinting is normally performed by the seller of card 5 and involves the following operations:
   (a) inserting the card into the imprinting apparatus, FIGS. 4 and 9,
   (b) determining that the card is present and in position,
   (c) locking the card receiving system,
   (d) checking for good electrical contact between the circuits of the card and those of the apparatus,
   (e) determining that the card is blank,
   (f) imprinting and displaying the card identifying code, the unit of consumption identifying code, and the number of units to be fed into the card,
   (g) transfer of the above data mentioned in (f) to the card,
   (h) a check on the transfer;
(2) using the card, but only in the appropriate apparatus. To this end, the user,
   (a) inserts the card in the receiving system of the apparatus, FIGS. 5 and 10, (b) feeds the required number of consumption units into the apparatus by means of the keyboard.

When the card is being used, the same phases as purchasing phases (b), (c), and (d) then occur; then the card memory field 4 is decremented by an amount corresponding to the number of units displayed on the operating apparatus. Decrementing is performed after a check has been made that the number of units available in the memory is greater than or equal to the number of units displayed.

These operations are now described in more detail.

A blank card 5 is inserted in the receiving device (FIG. 6) associated with the imprinting apparatus (FIG. 4).

The flap 32 is opened and the card is slid into position, as shown in FIG. 5, so one of its edges is engaged by detector 35. The card is correctly located relative to reading head 38 by means of pegs (not shown). The flap 32 is closed again, causing member 44 to be withdrawn from detector 37 (FIG. 7) and pins 39 to be brought into position opposite the appropriate contacts carried by card 5.

Figure 11:
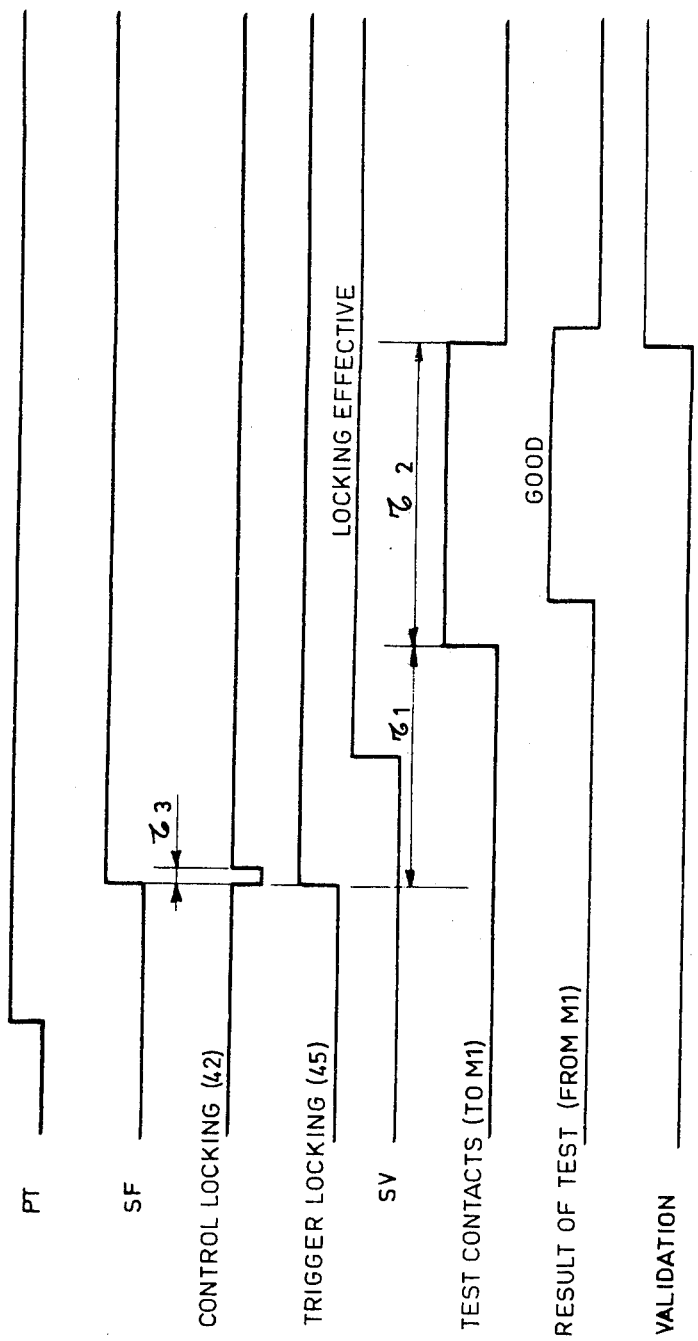
FIG. 11 is a timing diagram of signal waveforms which occur during contact testing operations (when the contacts are good)
Figure 12:
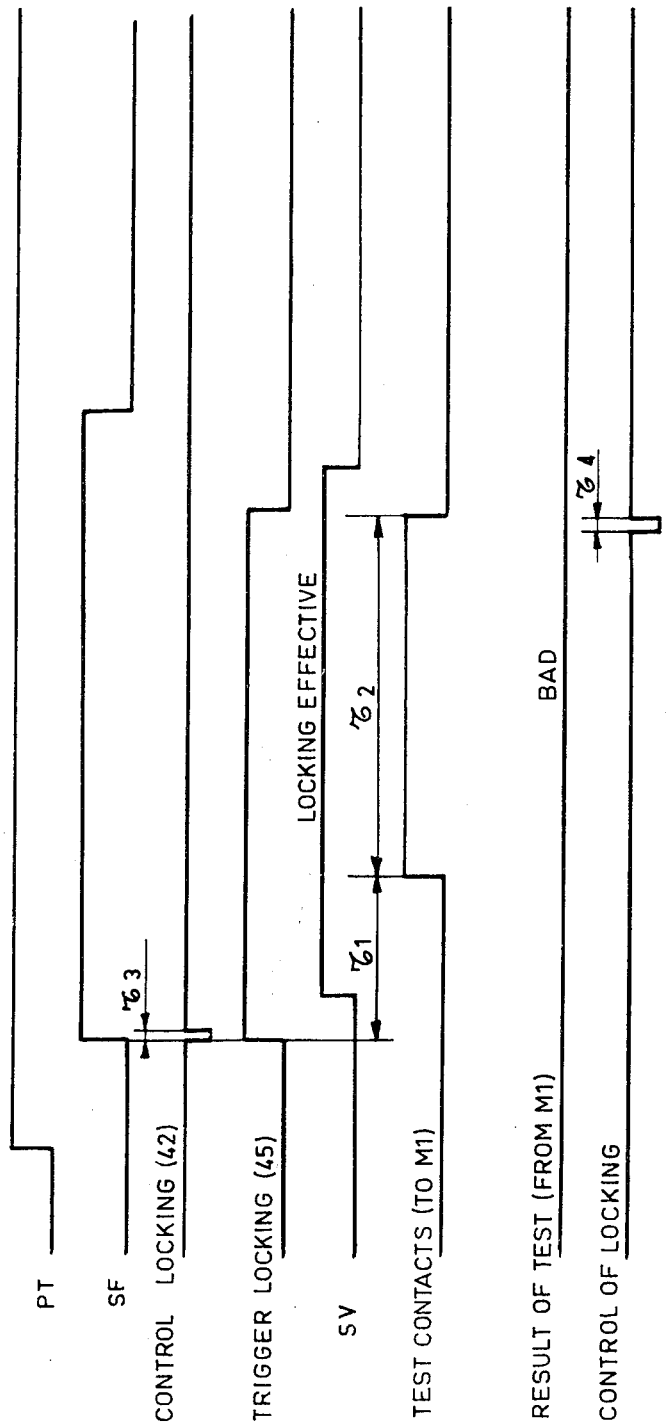
FIG. 12 is a timing diagram of signal waveforms which occur during contact testing operations (when the contact is bad)

The presence of card 5 is detected by detector 35, which generates signal PT (FIG. 11). A 1 bit appears at the output of pulse shaper 40 (card in place) to enable AND gate 41. A 0 bit (signal SF) appears at the output of detector 37 when the flap is closed. Inverter 43 derives a 1 bit that is fed through enabled AND gate 41 and which in turn triggers monostable 42 that generates a negative going pulse of length τ3 to order locking of flap 32. This pulse triggers locking flip-flop 45 which, via circuit 46, operates catch 36 (signal SV), that locks the flap in its closed position.

At the end of the period τ1 (determined by monostable 47), having a length to ensure that the flap is properly locked, monostable 48 emits a signal of length τ2 to command testing of the contacts on the card; the signal of length τ2 is coupled to buffer M1. If the test indicates the contacts are in place (FIG. 11), the locked state is maintained and a validating signal is transmitted to voltage supplies M2 by flip-flop 49. If the test indicates the contacts are not in place (FIG. 12), a pulse of length τ4 is emitted by monostable 51 at the conclusion of the signal generated by monostable 48; the pulse of length σ4 sets flip-flop 45 to zero, which in turn enables flap 32 to be unlocked. When flap 32 is not locked or is not held in place by the operator, it is opened by a spring.

Figure 13:
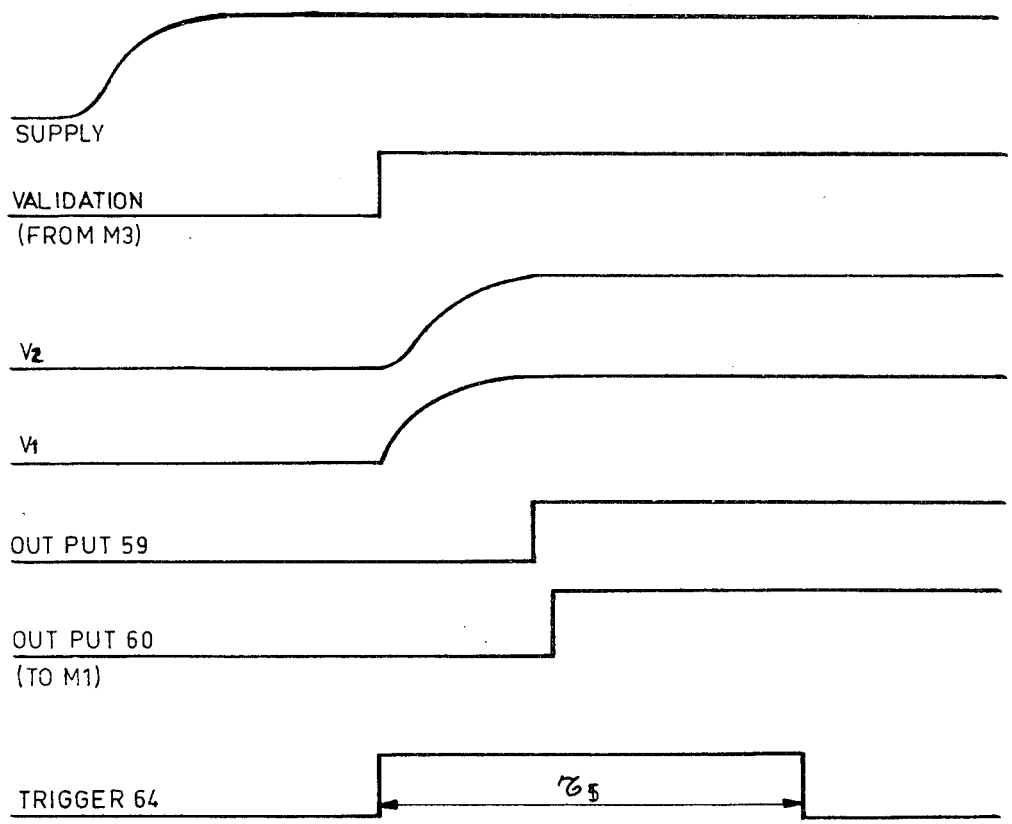
FIG. 13 is a timing diagram of signal waveforms which occur when voltages V1 and V2 are applied.

Power supplies 53 and 56 (FIG. 8) of supply M2 are enabled by a signal from testing and checking circuit M3. Circuits 57 and 58 enable voltages V1 and V2 to be detected locally. If both voltages have correct values, AND gate 59 derives a binary 1 signal (FIG. 13). The binary 1 signal enables AND gate 60 to pass the signal generated by comparator 61 that detects the change in current ΔI1 caused by the card when conditions are as they should be.

The enabling signal from testing and checking circuit M3 activates monostable 64, which generates a pulse of length τ5; the trailing edge of the τ5 pulse enables AND gate 63 to determine whether the output of comparator 61 is a positive voltage. If the output of comparator 61 is not satisfactory (i.e., no voltage available from card 5) monostable 62 generates a negative-going pulse of length τ6 which brings operations to an end, that is, unlocks flap and deactivates power supplies 55 and 56 (FIG. 14).

In response to the "contact-test request" signal from testing circuit M3, OR gates 68 and 69 (FIG. 9) derive signals VE and inverters 72 and 73 derive signals $\overline{SE}$. Signals VE activate circuits 66 and 67 so that signals SE are respectively derived from the H and E/S outputs of circuits 66 and 67 if the contacts of card 5 are properly engaged by pins 39. Proper contact also causes circuits 66 and 67 to derive binary one BC signals. The binary one BC signals are combined by AND gate 76', which thereby generates a "test result" signal that is applied to a testing circuit M3. The signal Vcst (FIG. 15) from supplies M2 starts clock 77 (if the "registers loaded" signal RC is at 1) and activates register 104 so the register generates the successive phase signals $\phi'1$ to $\phi'7$. Signal RC is derived from any one of registers 26, 27 and 28 (FIG. 4) once any one of them has received the values which it is desired to imprint on the card; these values are supplied to the registers in response to the operator activating keyboard 24.

During phase $\phi'1$ (FIG. 18) memory 6 of card 5 is energized to the read-out state by the $\overline{Q}$ output of flip-flop 20 (FIG. 3) so the contents of the 2048 addresses of memory 6 are then transmitted by signal SL (at the output of circuit 67) to the J input of flip-flop 81 (FIG. 9). If memory 6 of card 5 is not blank, i.e., bit zero of the memory is a binary one, flip-flop 81 is set to 1 by signal SL. At the end of phase $\phi'1$, flip-flop 82 is set to 1 in response to the trailing edge of a 1 being coupled to the clock input of the flip-flop; with flip-flop 83 set to 1, light emitting diode 83 is excited to warn the operator that the card is unusable. The operator then presses button 102 to initialize (zero-reset) the apparatus for possible further use.

Figure 15:
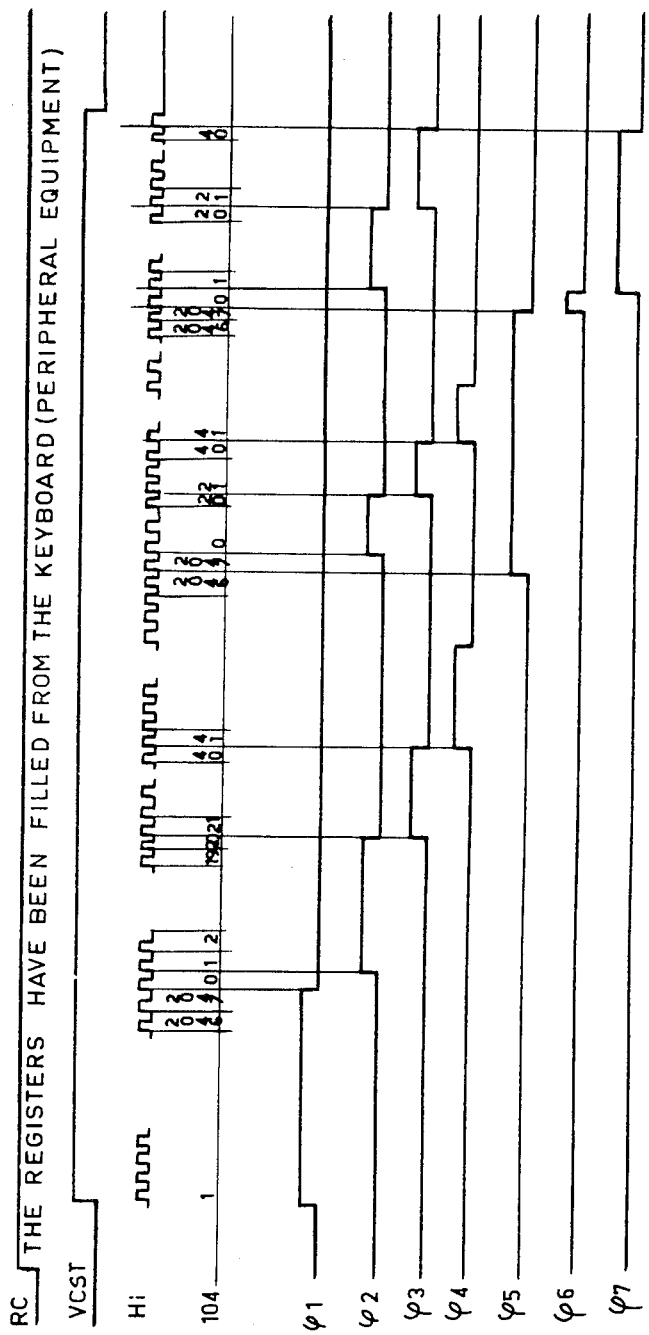
FIG. 15 is a timing diagram of the waveforms of writing phase signals.
Figure 18:
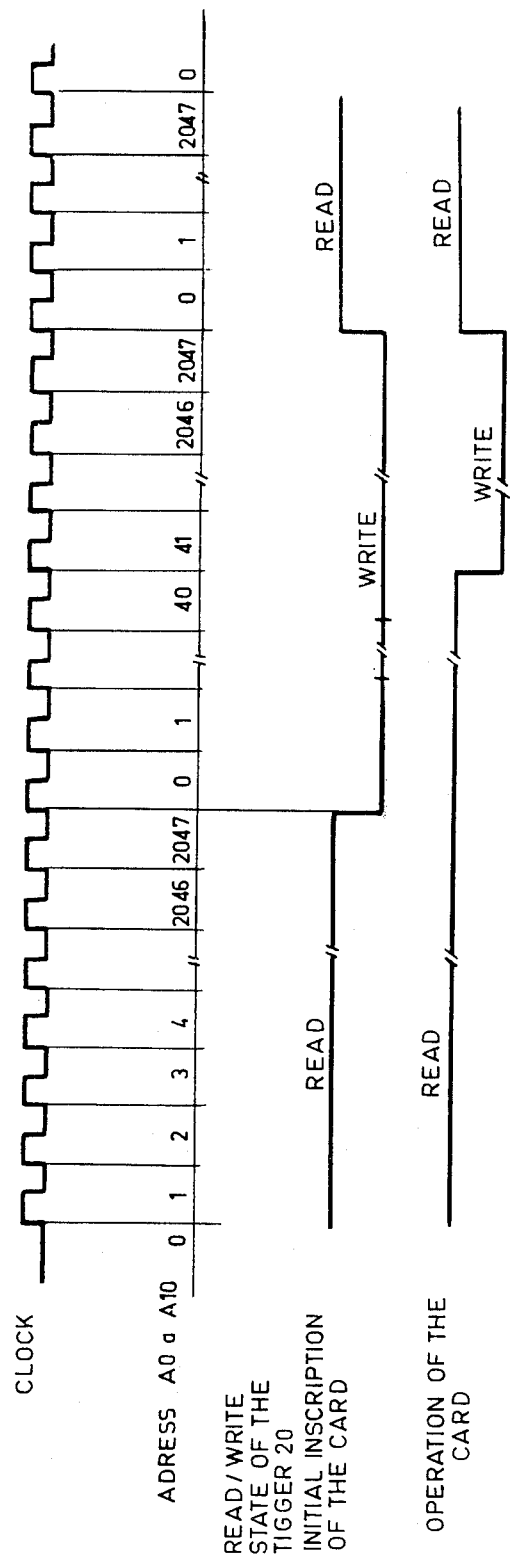
FIG. 18 is a timing diagram of the waveforms of read/write signals for the memory.

If the memory of the card is blank (bit zero=0) flip-flop 81 remains at zero because no SL signal is fed through gate 79 to the J input of flip-flop 81. The various phaess $\phi'1$–$\phi'7$ then progress in the normal way (FIGS. 15 and 18). At the beginning of phase $\phi'2$, fliip-flop 30 (FIG. 3) activates memory 6 to the write state by detecting address 2047 at the output of counter 12. Memory 6 remains in the write state for the entire duration of phase $\phi'2$, $\phi'3$ and $\phi'4$ until counter 12 overflows.

During phase $\phi'2$, the content of register 26 (the code identifying the use of the card) are transferred via gates 75, 74, 71 and circuit 67 to memory 6 of card 5. The contents of register 26 are preserved by a looped, i.e., feedback shift.

During phase $\phi'3$, the contents of register 27 (the code identifying the units in which the services or goods are supplied) are transferred via gates 76, 74, 71 and circuit 67 to memory 6 of card 5; the contents of register 27 being preserved by a looped shift. During this same phase, $\phi'3$, the contents of register 28 (the number of units to be imprinted on the card) are fed into register 105.

During phase $\phi'4$, the Nl bits from register 105 are transferred via gates 71 and 74 to card memory 6 by circuit 67. Phase $\phi'4$ is terminated by counter 104 being stepped back to zero. When counter 104 has counted to 4096, signal $\phi'5$, (FIG. 18) allows the information previously imprinted in memory 6 to be checked. To this end, the contents of memory 6 (signal SL) are compared in OR-exclusive gate 80 with the contents of registers 26 and 27 during phase $\phi'4$. If this comparison indicates a difference between the imprinted information and the information in registers 76 and 77, flip-flop 87 is set to 1. At the end of such a comparison, flip-flop 88 is set to 1, causing light emitting diode 89 to be energized to warn the operator that the card is incorrectly imprinted. The succession of operations is then halted and the operator presses button 102 to initialize the apparatus. If the comparison reveals no difference, flip-flop 87 remains at zero and the system advances to phase $\phi'6$. During this period, the enabling bit of card memory 6, memory zone zero, is set to 1.

During phase $\phi'7$, if the zero zone bit has been correctly imprinted as a one, bits 1 to 40 on the card are read out and compared in gate 80 with the bits in the corresponding stages of registers 26 and 27. If, at the end of this period, the comparison is satisfactory, energization of LED 96 provides an indication that the zero bit has been correctly imprinted. If the comparison is unsatisfactory, LED 94 is energized to signify that the zero bit has not been correctly imprinted.

Indications that normal and abnormal operations have terminated (signals FINN and FINA, respectively), are supplied to external equipment; signal FINN authorizes or validates the prospective transaction. Signals FINN and FINA are respectively derived from flip-flop 93 and inverter 100. Both the normal and abnormal terminations of operations are signalled by AND gate 99 to testing circuit M3 so that the card can be recovered.

Network M'1, FIG. 10, is used in the machine of FIG. 5 to allow the card to be used. This machine includes a device for receiving the card to be decremented (debited); many parts of the machine of FIG. 5 are identical to those of the machine of FIG. 4 for imprinting the cards and are illustrated in detail in FIG. 10. Corresponding elements of the circuits of FIGS. 9 and 10 bear the same reference numerals for convenience.

As soon as card 5 has been placed in the receiving device of FIG. 5, the "contact-test" signal from testing circuit M3 enables circuits 66 and 67 (FIG. 19), causing signal SE to be derived at outputs H and E/S. If the contacts are satisfactory, the signals BC from circuits 66 and 67 have 1 values that are combined at AND gate 76'. In response to the binary one BC signals, gate 76' derives the "result of test" signal which is transmitted to checking circuit M3. The signal Vcst from supplies M2 starts clock 123 if the signal RC has a 1 value to indicate that all of registers 26, 27 and 28 are loaded, that is, when the user has fed the requisite information (the identity code of the card, the identity code for the unit, and the number of units to be incremented) into the registers by means of keyboard 24.

Figure 16:
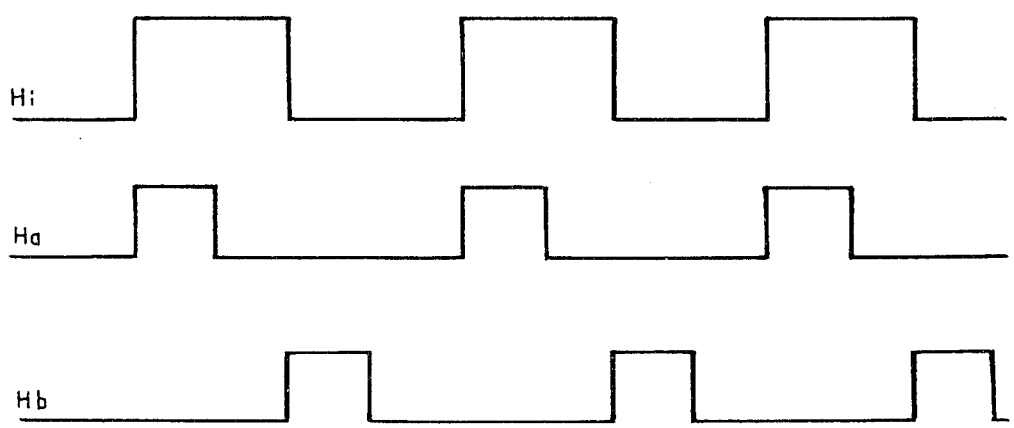
FIG. 16 is a timing diagram of the waveforms of clock signals.
Figure 17:
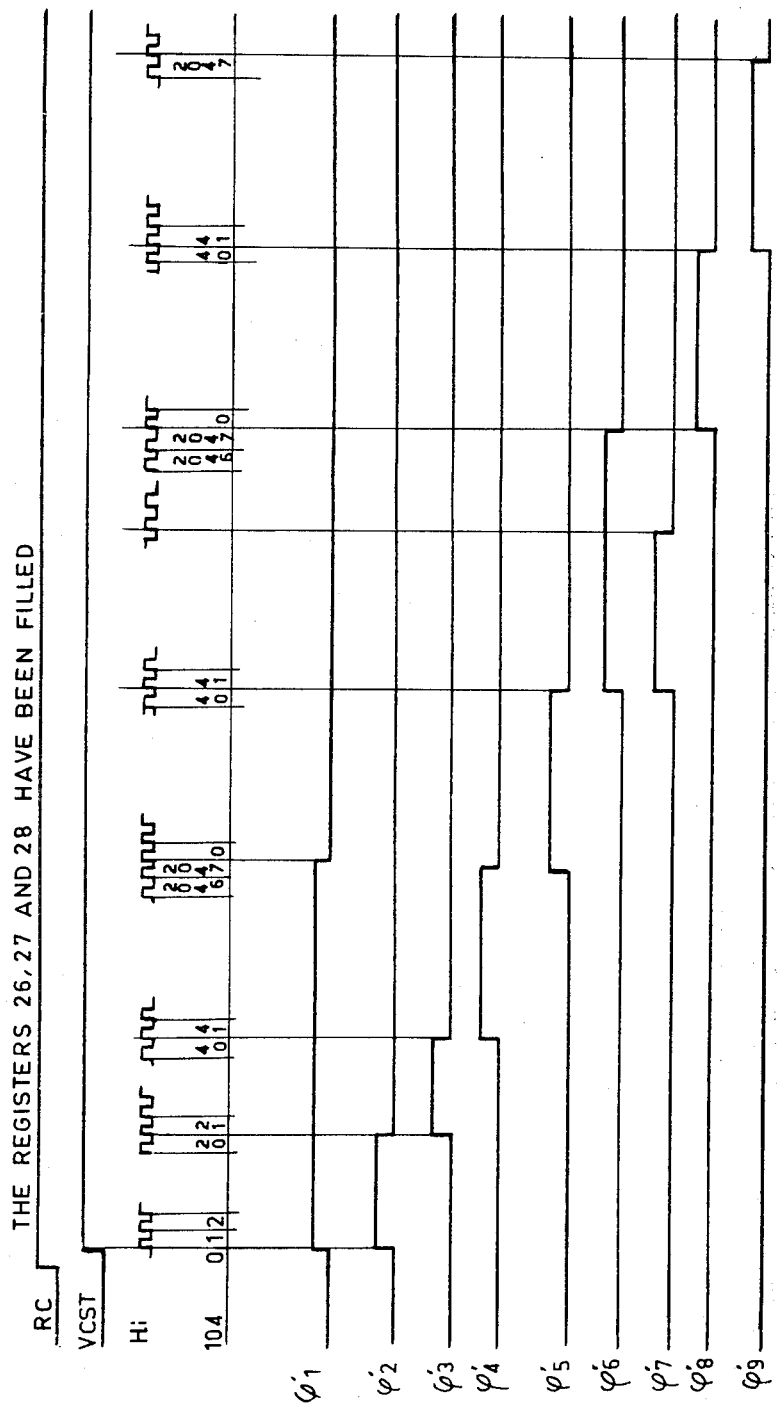
FIG. 17 is a timing diagram of the waveforms of operating phase signals.

In addition to signal Hi, signals Ha and Hb (FIG. 16) are generated by clock 123. Signals Hi, Ha and Hb all have the same frequency, but the pulses of Ha and Hb have pulse lengths half those of pulses Hi; the leading and trailing edges of pulses Hi are respectively synchronized with the leading edges of pulses Ha and Hb. The progression of the various phase $\phi'1$ to $\phi'9$ is shown in FIG. 17.

As soon as signal Vcst appears, phase $\phi'1$ commences. During phase $\phi'1$, the zero bit of memory 6 at address 1 is detected as a result of counter 12 being driven to address 1; the detected zero bit sets the Q output of flip-flip 17 (FIG. 3) to the 1 state. During phases $\phi'1$ to $\phi'5$, memory 6 is set to the read-out state by flip-flop 20 and remains in this state until the combination A3, A5, All appears at the input of AND gate 19 while the gate is enabled by the Q output of flip-flop 17.

At the beginning of phase $\phi'2$, the data at the zero address location of card memory 6 is examined and an inverted replica of output SL from circuit 67 is applied to flip-flop 108. If the data at address zero is zero, flip-flop 108 is set to 1, causing LED diode 114 to be lit. A signal FINA (abnormal termination) is transmitted by inverter 161 to the apparatus which supplies the goods or service. A "normal or abnormal termination of operations" signal is transmitted by OR gate 162 to testing and checking circuit M3 to recover the card and the succession of operations is interrupted. The apparatus is reset to zero by the operator pressing button 102. If the data at address zero is 1, flip-flop 108 remains in the 0 state and the succeeding operations continue without interruption.

During phases $\phi'2$ and $\phi'3$, fields 2 and 3 of card 5 (the card-identifying and unit-identifying code, respectively) are compared in exclusive OR gate 110 (FIG. 10) with the contents of registers 26 and 27 that are supplied to the gate 110 via gates 120–122. If contents of registers 26 and 27 differ from fields 2 and 3 of card 5, flip-flop 111 is set to 1 by the output of gate 110. At the beginning of phase $\phi'4$, the output of flip-flop 111 sets flip-flop 112 to 1, causing diode 115 to light. The signal FINA (abnormal termination) is emitted and a "normal or abnormal termination" signal is transmitted to checking circuit M3 to prevent operations from continuing. The apparatus is then reset to zero in response to the operator pressing button 102. If the contents of registers 26 and 27 are identical, flip-flop 111 remains set to 0, the cascaded arrangement of flip-flops 111–113 causing flip-flop 113 to be set to 1 at the beginning of phase $\phi'4$. Diode 116 is then lit and the succession of operations continues.

During phase $\phi'4$, card 5 is still being readout. The number of 1 bits in fields or zones 2 and 3 is counted in counter 130. If the number, N, of one bits in counter 13 equals Nmaxi (the number of locations available in the memory of the card) the counter 130 overflows and thereby sets flip-flop 137. Diode 138 is then lit to indicate that all the card sections have been used and operations are stopped by the "abnormal termination" signal. If the number N is less than Nmaxi, operations continue. In addition, during phase $\phi'4$, the number, N, of one bits on card 5 and the number of bits, P, to be altered (to be changed from 0 to 1) are counted in counter 126, which adds them together to derive a count of (N+P). The N and P signals are supplied to counter 126 through gates 127–129 such that each bit of register 28 alternates with each bit of card memory 6 in synchronization with the signals Ha and Hb (FIG. 16). If (N+P) is equal to Nmaxi, counter 126 overflows to set flip-flop 134. Diode 135 is then lit to indicate that the number of locations available on the card is insufficient to enable the P units to be recorded. Operations are stopped by a "normal termination" signal. If (N+P) is less than Nmaxi, operations continue. During phase $\phi'5$, the (N+P) contents of counter 126 are transferred to counter 130 so the latter stores a count for the number of bits on the card which are to be changed from 0 to 1.

At the end of phase $\phi'5$, the system advances in sequence to phases $\phi'6$, $\phi'7$, during which flip-flop 140 is set at 1. During phases $\phi'6$ and $\phi'7$ data are written into memory 6 of card 5. At this time, the $\overline{Q}$ output of flip-flop 20 is changed to the 0 state and circuit 67 is enabled so an output can be derived from it, and counter 130, which contains (N+P), is counted down. In response to the count of counter 130 reaching zero, flip-flop 140 is set to 0. During the whole period while flip-flop 140 is generating signal $\phi'7$, 1's are imprinted in memory 6 of the card 5. After phase $\phi'7$ has been completed and until the end of φ'6, 0's are recorded in memory 6 of card 5, that is, there is no change in the card memory.

During phase φ'8, the (N−P) count of counter 126 is again transferred to counter 130; during this phase, card memory 6 is once again in the readout state.

During phase φ'9, card 5 is still being readout and counter 130 is being counted down. There are three possible cases, namely:

(a) Normal case: the number of 1 bits on the card equals (N+P), in which case the overflow of counter 130 corresponds to SL=0 from circuit 67. Because the overflow of counter 130 sets flip-flop 144, flip-flop 146 is set if the next location in card memory 6 is 0. Setting flip-flop 146 causes diode 150 to light. Operations are then brought to an end by a normal termination signal derived from gate 162 and the user station M4 is supplied with a normal termination signal FIND.

(b) Abnormal case No. 1: the number of 1 bits on card 5 is (N+P+a), where a≥1. Overflow from counter 130 corresponds to SL=1 from circuit 67. The overflow from counter 130 sets flip-flop 144, whereby flip-flop 146 is set if the next card location is a 1. Setting flip-flop 146 causes diode 152 to light and the operations are brought to an end by an abnormal termination signal FINA derived from AND gate 160 and inverter 161.

(c) Abnormal case No. 2: the number of 1 bits on the card is (N+P−a), where a≥b. In this case, flip-flop 155, having been set to 1 at the beginning of phase φ'9, changes to zero before flip-flop 144 changes to 1. Flip-flop 157 is thus set to 1, to energize LED 158 and operations are brought to an end by an abnormal termination.

The termination has been described in the context of one of its applications to certain transactions, that is, the provision of certain services in exchange for a sum of money. This type of application may involve a number of transactions between a private person and a company or undertaking, whether it be state-run or private. Thus, the system of the invention may be applied, as described above to payment for telephone calls from public or private telephones or to the purchase of postage stamps, as well as to obtain and/or pay for many other services, such as electricity supplies, gasoline, meals, or hotel services such as meals and rooms.

Each application requires a special form of the apparatus for supplying or recording the service in question. In certain cases, the service would not be provided until after the corresponding debit has been recorded on the support article. In other cases, recording on the said article will only be performed for purposes of payment and/or registration. The invention does not envisage only simple transactions, but is applicable to any general operation involving crediting or debiting the card holder a cetain value representing any type of consumption or use, a check, a penalty, etc.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. A credit card for keeping a record of predetermined homogeneous credit units, said credit card being adapted to be used with external means for imprinting and/or operating on information stored on the credit card, the credit card comprising:

a memory circuit for storing coded information, said memory including:
(a) a first unalterable multi-bit field indicative of an identification of the external means with which the card can be used,
(b) a second unalterable multi-bit field indicative of operations that can be performed with the card on the external means with which the card can be used, and
(c) an alterable multi-bit field indicative of the number of credit units available to the holder of the card;

circuits for reading bits from the alterable multi-bit field and from the first and second unalterable multi-bit fields and for writing bits into the alterable multi-bit field; and means for temporarily and selectively coupling the memory and circuits to the imprinting and operating means, each of the first and second unalterable bit fields including n bits, a change from one bit state to the other bit state of bits in the unalterable fields being in an irreversible state after imprinting of bits therein, the number, m, of bits in the irreversible state in each field being less than n, the number m being pre-established.

2. The card of claim 1 wherein each of the unalterable fields of the memory includes plural electric micro-circuit elements having an irreversible change in physical state, each of said electric micro-circuit elements storing an item of data written into the memory indicative of the number of items used relative to the number of items available.

3. The structure of claim 1, wherein each of the bits in each unalterable field is of a type which initially has a first predetermined binary value and is irreversibly changed to a second binary value.

* * * * *